Patented Aug. 4, 1953

2,647,925

UNITED STATES PATENT OFFICE 2,647,925

PROCESS FOR PREPARING MONOSULFONATED SATURATED ALIPHATIC DICARBOXYLIC ACIDS

Everett E. Gilbert, Flushing, and Silvio L. Giolito, New York, N. Y., assignors to Allied Chemical & Dye Corporation, New York, N. Y., a corporation of New York No Drawing. Application April 10, 1951,
Serial No. 220,362

13 Claims. (Cl. 260—513)

1

This invention relates to a process for preparing monosulfonated saturated aliphatic dicarboxylic acids having at least 4 carbon atoms by direct sulfonation with liquid sulfur trioxide.

Sulfonated aliphatic dicarboxylic acids have been prepared in the past by sulfonating the saturated acids with $SO_3$, chlorosulfonic acid, oleum or the like, or by adding a sulfite or bisulfite to the corresponding unsaturated acid or its salts.

Sulfonations of dicarboxylic acids carried out in the past, using sulfur trioxide as the sulfonating agent, have failed to proceed smoothly to produce appreciable yields of the monosulfodicarboxylic acids.

It has been proposed to sulfonate organic compounds with sulfur trioxide at elevated temperatures using a quantity of the sulfonated product itself as a solvent for the organic compound and as a medium for carrying out the reaction. In the sulfonation of the organic acids with which the present invention is concerned, we have found that such procedure, while operative to produce monosulfonated products, has the disadvantage, especially in the cases of acids such as sebacic ($C_{10}$) and other high carbon acids, that these monosulfonated products are extremely viscous liquids at the reaction temperatures, so that the mass is difficult to agitate. Inadequate agitation prevents uniform intimate contact between reactants and results in irregular temperature control with consequent charring and discoloration. Furthermore, the monosulfonic acids are subject to further sulfonation especially under non-uniform reaction conditions so that a part of the desired product is converted to disulfo or polysulfo compounds.

It is an object of the present invention to provide a process for preparing essentially monosulfonated saturated aliphatic dicarboxylic acids having at least 4 carbon atoms.

It is a further object of the invention to provide a process wherein such monosulfonated dicarboxylic acids are obtained directly in high yields.

These and other objects are accomplished according to our invention, wherein saturated aliphatic dicarboxylic acids having at least 4 carbon atoms are reacted in the liquid phase with liquid sulfuric anhydride (sulfur trioxide) in the presence of liquid trichloroacetic acid as the reaction medium.

The reaction according to our invention proceeds as follows:

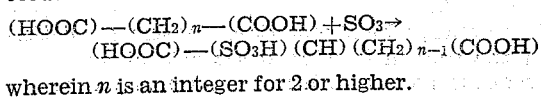

wherein $n$ is an integer for 2 or higher.

2

The acids for which the sulfonation process of our invention is adapted are those indicated above, preferably alpha, omega dicarboxylic acids containing from 5 to 10 carbon atoms inclusive. Among these acids are included glutaric acid (pentanedioic acid), adipic acid (hexanedioic acid), pimelic acid (heptanedioic acid), suberic acid (octanedioic acid), azelaic acid (nonanedioic acid), sebacic acid (decanedioic acid), etc. It is particularly adapted for the sulfonation of higher carbon content dicarboxylic acids, such as sebacic acid, whose monosulfonation products are extremely viscous and difficult to agitate.

In carrying out the process according to our invention, the dicarboxylic acid and liquid sulfur trioxide are reacted in a medium of trichloroacetic acid, for example by intimately mixing the reactants and reaction medium in the liquid phase. The mixing is preferably carried out by first dissolving the dibasic acid in the trichloroacetic acid either at ordinary room temperature (e. g. ca. 25° C.), or, if necessary, heating the mixture as high as about 80° C., and then adding liquid sulfur trioxide, preferably gradually or dropwise or in small increments while agitating the mixture to secure adequate dispersion of the $SO_3$ throughout the mixture. After addition of $SO_3$, the mixture is heated somewhat, preferably to between about 80° C. and about 100° C. and allowed to digest and react at this temperature, while continuing the agitation, for a period sufficient to insure substantially complete monosulfonation of the dicarboxylic acid, usually a period of between about 15 minutes and about 60 minutes being sufficient. After the sulfonation reaction is complete, the reaction product may be recovered by removal of the trichloroacetic acid reaction medium as by distillation, preferably under vacuum. The product remaining after removal of the trichloroacetic acid is substantially entirely the monosulfodicarboxylic acid which is obtained by our process in substantially quantitative yields based on the dicarboxylic acid used.

The sulfodicarboxylic acids thus obtained are uncontaminated with water and are usually only slightly contaminated with polysulfonic acids, resulting in a slight excess of acidity of the product over that attributable to the two carboxyl groups and the sulfonic acid group. The dicarboxylic sulfoacids thus produced are useful as intermediates in the preparation of esters such as the aliphatic esters which are of value as surface tension reducing agents.

The use of trichloroacetic acid as reaction medium in carrying out the process of our invention permits the reaction to be carried out entirely in the liquid phase since trichloroacetic acid is a solvent, not only for the $SO_3$ and dicarboxylic acid reactants, but is also a solvent for the sulfodicarboxylic acid reaction products, and, moreover, it has volatility characteristics (B. P. 197.5° C.) relative to those of the sulfodicarboxylic acids such that it is readily removed from the reaction product by distillation, as the sulfodicarboxylic acids of the character contemplated have higher boiling points than the trichloroacetic acid. The quantity of trichloroacetic acid used is not critical, but should be sufficient to maintain reactants and reaction products in a relatively fluid, stirrable condition, preferably in solution during the course of the reaction, quantities between about 1½ and about 3 times the weight of the reactants usually being sufficient.

The sulfuric anhydride is used in the liquid state and in quantities at least the molecular equivalent of the dicarboxylic acid to insure substantially complete monosulfonation of the acid; usually a slight excess, for example about 10% molar excess is sufficient. Large excesses should be avoided as the excess not only reacts with any moisture present to form sulfuric acid and thus to contaminate the resulting sulfodicarboxylic acid, but also tends to form disulfonates. For these reasons, it is preferable to carry out the reaction in the substantial absence of water and with substantially equimolecular quantities of reactants, using not more than about 10% molar excess of $SO_3$.

The temperature of reaction is not unduly critical and the reaction may be carried out at any convenient temperature between ordinary room temperature (ca. 25° C.) and about 125° C., preferably between about 60° C. and about 100° C. In general, we prefer to intimately mix the reactants at temperatures not greatly in excess of about 70° C., and thereafter allow them to react at slightly higher temperatures, for example between about 80° C. and about 100° C. to first form the sulfate and then permit its rearrangement to the sulfonate as is well known.

At lower temperatures, the reaction is considerably slower than at the preferred temperatures mentioned. Higher temperatures may hasten the reaction somewhat but are not usually necessary as at the preferred temperature, reaction is usually complete in not more than about an hour.

The following specific examples further illustrate the invention. Parts are by weight except as otherwise indicated.

*Example 1*

To a solution of 30 parts (0.23 mol) of glutaric acid dissolved in 75 parts of trichloroacetic acid at 65°–75° C. were added dropwise over a two minute period with agitation, 20 parts (0.25 mol) of commercial stabilized liquid sulfur trioxide. The resulting mixture was then heated to 95° C. and held at this temperature for 30 minutes with continued agitation. After this interval, the mixture was vacuum distilled to remove trichloroacetic acid of which 73.5 parts were recovered. The remaining water-soluble reaction product amounted to 49 parts corresponding to 98% of theoretical. The total acidity of the product was 110% of theory required for monosulfoglutaric acid.

*Example 2*

To a solution of 146 parts (1 mol) of adipic acid in 200 parts of trichloroacetic acid at 70° C. were added dropwise over a 30 minute period, with agitation, 88 parts (1.1 mols, 10% excess) of liquid sulfur trioxide, the temperature rising as high as 89° C. during the addition. The resulting mixture was then heated to 95° C. and held at about this temperature with continued agitation for 25 minutes. The mixture was then subjected to vacuum distillation to remove trichloroacetic acid, of which 191 parts were recovered. The remaining water-soluble reaction product amounted to 216 parts corresponding to 92.4% of theory and had a total acidity of 102% of theory required for monosulfoadipic acid.

*Example 3*

To a solution of 50 parts (0.27 mol) of azelaic acid in 100 parts of trichloroacetic acid at 60° C. were added dropwise over a period of 15 minutes with agitation, 23.3 parts (0.29 mol) of liquid sulfur trioxide, the temperature rising to 80° C. The mixture was then heated at 80° C. and maintained at this temperature with continued agitation for 15 minutes. The charge was thereafter vacuum distilled to remove trichloroacetic acid, 93.9 parts being recovered. The remaining reaction product amounted to 72 parts corresponding to 98.4% of theory. The total acidity was 109% of theory required for monosulfoazelaic acid. The reaction product was completely soluble in water.

*Example 4*

To a solution of 50 parts (0.25 mol) of sebacic acid in 100 parts of trichloroacetic acid at 50° C. were added dropwise over a six minute period, with agitation, 30.8 parts (0.38 mol) of liquid sulfur trioxide, the temperature rising to 70° C. The resulting mixture was heated to 90° C. and maintained at about this temperature with continued agitation for one hour, whereupon the charge was vacuum distilled to remove trichloroacetic acid, of which 97.1 parts were recovered. The remaining reaction product amounted to 72.2 parts corresponding to 89.4% of theory. The total acidity was 110% of theory required for the monosulfosebacic acid. The product was completely water-soluble.

While the above describes the preferred embodiments of our invention, it will be understood that departures may be made therefrom within the scope of the specification and claims.

We claim:

1. A process for preparing monosulfonates of saturated aliphatic dicarboxylic acids having at least 4 carbon atoms, which comprises reacting in the liquid phase substantially equimolecular quantities of a dicarboxylic acid as defined above, and liquid sulfur trioxide in a trichloroacetic acid reaction medium at temperatures in the range between about 60° C. and the boiling point of trichloroacetic acid, namely 197.5° C.

2. A process for preparing monosulfonates of saturated aliphatic dicarboxylic acids having at least 4 carbon atoms, which comprises reacting in the liquid phase substantially equimolecular quantities of a dicarboxylic acid as defined above, and liquid sulfur trioxide in a trichloroacetic acid reaction medium at temperatures between about 60° C. and about 100° C.

3. The method of sulfonating a saturated aliphatic dicarboxylic acid having at least 4 carbon atoms, which comprises treating a solution of the acid in trichloroacetic acid at about 60° to about 125° C. with liquid sulfur trioxide.

4. The method of claim 3 wherein sulfonation temperatures are maintained between about 60° C. and about 100° C.

5. A process for sulfonating a dicarboxylic acid having the following formula

HOOC—(CH$_2$)$_n$—COOH wherein $n$ represents an integer from 3 to 8 inclusive, which comprises mixing said acid in a liquid trichloroacetic acid reaction medium at temperatures in the range between about 60° C. and the boiling point of trichloroacetic acid, namely 197.5° C., with liquid sulfur trioxide until substantially complete monosulfonation of the acid has been effected.

6. The process according to claim 5 wherein the reaction medium is maintained at a temperature not above about 100° C.

7. In a process for sulfonating dicarboxylic acids to produce the monosulfonates thereof, the steps which comprise mixing, in a medium of liquid trichloroacetic acid, with agitation, a dicarboxylic acid having the following formula HOOC—(CH$_2$)$_n$—COOH wherein $n$ represents an integer from 3 to 8 inclusive, with liquid sulfur trioxide, at temperatures between about 25° C. and about 80° C., raising the temperature to between about 80° C. and about 100° C., and continuing the agitation of the resultant mixture within the above temperature limits until substantially complete monosulfonation has been effected.

8. The process according to claim 7 wherein the dicarboxylic acid is glutaric acid.

9. The process according to claim 7 wherein the dicarboxylic acid is adipic acid.

10. The process according to claim 7 wherein the dicarboxylic acid is azelaic acid.

11. The process according to claim 7 wherein the dicarboxylic acid is sebacic acid.

12. In a process for monosulfonating dicarboxylic acids, the steps which comprise dissolving in liquid trichloroacetic acid, at a temperature of at least about 60° C., a dicarboxylic acid having the formula HOOC—(CH$_2$)$_n$—COOH wherein $n$ represents an integer from 3 to 8 inclusive, adding thereto, gradually while agitating, liquid sulfur trioxide, raising the temperature of the resulting mixture to between about 80° C. and about 100° C., continuing agitation of the mixture at the above temperatures for not more than about one hour and thereafter removing trichloroacetic acid by vacuum distillation and recovering the monosulfodicarboxylic acid product.

13. In a process for sulfonating dicarboxylic acids to produce the monosulfonates thereof, the steps which comprise mixing, in a medium of liquid trichloroacetic acid, with agitation, a dicarboxylic acid having the following formula HOOC—(CH$_2$)$_n$—COOH wherein $n$ represents an integer from 3 to 8 inclusive, with liquid sulfur trioxide, at temperatures between about 25° C. and about 80° C., raising the temperature to between about 80° C. and about 100° C., and continuing the agitation of the resultant mixture within the above temperature limits until substantially complete monosulfonation has been effected, removing the trichloroacetic acid reaction medium and recovering the monosulfonated dicarboxylic acid product.

EVERETT E. GILBERT.
SILVIO L. GIOLITO.

References Cited in the file of this patent

UNITED STATES PATENTS

| Number | Name | Date |
|---|---|---|
| 2,252,401 | Jaeger | Aug. 12, 1941 |